| United States Patent Office | 3,554,789 |
|---|---|
| | Patented Jan. 12, 1971 |

3,554,789
PROCESS FOR THE PRODUCTION OF VAPOUR PERMEABLE MICROPOROUS STRUCTURES AND STRUCTURES OBTAINED BY THE PROCESS
Koji Kigane, Nobuji Ishihara, and Kazuo Koga, Miharashi, Japan, assignors to Teijin Limited, Osaka, Japan, a corporation of Japan
No Drawing. Filed Nov. 6, 1967, Ser. No. 681,024
Claims priority, application Japan, Nov. 7, 1966, 41/73,168
Int. Cl. D06n 3/14; B44d 1/44
U.S. Cl. 117—161
4 Claims

ABSTRACT OF THE DISCLOSURE

Process for preparing a vapour permeable microporous structure in which a coating of a dispersion of a polyurethane and an aqueous emulsion of a polymer is applied to the surface of a substrate and dried. A microporous structure which has a high velocity of vapour permeability is produced.

---

This invention relates to an improved process for the production of vapour permeable microporous structures by a novel method which may be called a semidry method, and to structures obtained by this process, especially those excellent for use as synthetic leather. More particularly, it relates to a process for producing vapour permeable microporous structures having a high velocity of vapour permeability and being not deteriorated in tear strength and appearance which are considered to be incompatible with this high vapour permeability, and structures produced by the process. According to the conventional process, it is extremely difficult to provide such a structure having a high velocity of vapour permeability, but this invention has made it possible to produce it with good reproducibility and ease of operational control.

Natural leathers, because of their excellent durability, vapour permeability and beautiful appearance, have been utilized in shoes and clothing. They are however weakened once they contain water, and it is impossible to obtain a great quantity of natural leathers having a uniform quality. Attempts have therefore been made in recent years to produce synthetic sheets which have removed the defects of natural leathers and possess excellent characteristics inherent to the natural leathers. In making such sheet materials, it is necessary to elevate their vapour permeability along with durability in order to satisfy comfort during use. This necessity has led to attempts of producing sheet materials having many fine open pores.

The conventional processes of making such vapour permeable microporous structures are roughly classified into a dry method and a wet method or semiwet method.

Typical examples of the wet or semiwet method are as follows:

(1) A method of providing micropores by treating a solid material dispersed or dissolved in a polymeric solution with a solvent which dissolves the solid material but is inert to the polymer, during or after the coagulation of the polymer, thereby to elute the solid material.

(2) A method of providing micropores by coating or impregnating a polymeric solution or a colloidal polymeric dispersion prepared by adding a poor solvent to it onto or into a substrate such as film and nonwoven fabric, and causing the moisture to be absorbed or extract the solvent with a poor solvent thereby to coagulate the polymer completely (U.S. Pats. Nos. 3,100,721 and 3,208,875).

(3) A method of providing micropores by utilising the difference in coagulating speed between two or more polymers in a poor solvent (Japanese patent application publication No. 18,236/65).

(4) A method of providing micropores by coprecipitation from a polymeric solution and a colloidal polymeric solution.

Microporous strucutres obtained by these wet or semiwet methods are excellent more or less in tear strength and appearance, but usually bad in other properties incompatible with them, particularly vapor permeability and have a small velocity of vapour permeability. According to method (1), it takes much time to effect the elution of the solid material, and it is difficult to obtain a product satisfactory in quality. Methods (2) through (4) necessitate much time in removing the solvent completely, and many and large apparatuses should be used in recovering the extracted solvent from the poor solvent. Another defect of method (4) is that the strength of a final sheet is insufficient.

A typical example of the dry method is as follows:

(5) A method of providing micropores by adding a foam-generating material to a polymeric solution or dispersion, and effect foaming during or after the coagulation of the polymer.

According to such dry method, closed cells are usually formed, and make it impossible to obtain open fine pores. Thus, the resulting sheet falls short of good vapour permeability. Although it is possible to produce a sheet having open cells and a high vapour permeability by this method, it is difficult to obtain a sheet having a desirable appearance because of the formation of macroporous pores visible to the naked eye. These are well known in the art.

As the result of our researches with an attempt to remove the defects of the above-mentioned conventional methods, we have found that by a novel method which may well be called a semidry method, it is possible to provide a vapour permeable microporous structure having a high velocity of vapour permeability which the conventional methods have found it exceedingly hard to provide and being not deteriorated in tear strength and appearance which are incompatible with this high vapour permeability. This semidry method, which will be more clarified in the description appearing later in the pages, is clearly distinguished from the conventional dry method in respect of not using a foam-generating material. It is also clearly distinguished from the conventional wet or semi-wet method in that a polymeric dispersion is coagulated without the use of a coagulating bath composed of a non-solvent and that the coagulation of the polymeric dispersion is completed by evaporating a poor solvent under the condition such as to prevent the evaporation of water but not to cause the water to be absorbed by the dispersion layer, whereby open fine pores are formed.

Accordingly, an object of this invention is to provide vapour permeable microporous structures having a markedly improved velocity of vapour permeability and being excellent in tear strength and appearance which are incompatible with this high vapor permeability by a novel method clearly distinguishable from the prior methods, and a process for the production of such structures.

Many other objects and advantages of this invention will become more apparent from the following description.

As already mentioned, a structure obtained by the dry method is in general good in vapour permeability, but is unsatisfactory in tear strength and appearance. On the other hand, a structure obtained by the wet method is usually good in appearance but is bad in vapour permeability. Furthermore, the wet method necessitates a long operation time, but the dry method has an advantage that it takes only a short time to operate the method. But this dry method at the same time suffers from disadvantage that it makes the tear strength and appearance unsatisfactory. It is evident therefore that if we can develop a method which is provided with the merits of the above-mentioned two methods and in which an inexpensive solvent can be used, such method is very desirable.

We have completed a method which is clearly distinguished from the wet method in respect of the absence of a coagulating treatment with a nonsolvent and is also distinguished from the dry method in respect of not using a foam-generating agent, and which suits the above-mentioned desirable objects.

Such objects of this invention can be achieved by a process for the production of microporous structures which comprises coating onto a surface of a substrate a polymeric dispersion containing as a film-forming component a polyurethane type polymer obtained by reaction of an isocyanate compound with an active hydrogen compound, and solidifying the said dispersion in a porous state, characterised by mixing (a) a slurry of a polyurethane type polymer obtained by dispersing the polyurethane type polymer in a poor solvent for the said polymer which has a boiling point not over 120° C. and a mutual solubility with water at 25° C. of not over 50% by weight with (b) an aqueous latex of a polymer swellable by but not completely soluble in the said poor solvent thereby to form a coating dispersion containing the said components (a) and (b) in which the water content has reached at least saturation with respect to the poor solvent in the said dispersion, applying the said dispersion to a substrate, selectively evaporating the said poor solvent, while preventing the evaporation of water from the formed dispersion layer not containing a foam-generation agent, in an atmosphere having a relative humidity of not more than 90% at a temperature not over 80° C. and at a temperature 20° C. lower than the boiling point of a poor solvent having a minimum boiling point and not less than the freezing point of the said solvent, preferably not less than 10° C. at least to the gellation point of the said dispersion, and thereafter drying the product.

This invention is characteristic in that the coating dispersion is formed by mixing a slurry of a polyurethane type polymer dispersed in a poor solvent having specific properties with an aqueous latex of a polymer swellable by but not completely soluble in the said poor solvent, and that as the water in the coating dispersion has reached at least saturation with respect to the said poor solvent, the said coating dispersion is no longer capable of absorbing any additional water. It is also characteristic in that a layer of the dispersion not containing a foam-generating agent is, without being subjected to a moisture-absorbing procedure, deprived of the said poor solvent by evaporation while the evaporation of the water is being prevented, and then drying is effected. This has completely obviated the necessity of utilising a moisture-absorbing phenomenon which is difficult to control and is bad in reproducibility in the semiwet method. Very uniquely, if only the resin component of the aqueous latex is used in preparing the slurry of polyurethane type polymer, the microporous structure intended in this invention cannot be obtained even by following the other steps of the present invention exactly as they are.

Now, the invention will be more detailedly described.

According to the process of this invention, it is necessary to prepare (a) polyurethane type polymer slurry and (b) aqueous latex each separately, and then mix both to make a coating dispersion. It should be noted that it is not sufficient merely to incorporate a film-forming component other than the polyurethane type polymer and water each separately into the slurry. According to such a case, it is impossible to make water present in the dispersion in an amount sufficient to form microporous structures. The slurry (a) mentioned above is low in viscosity. With the use of this slurry alone, it is difficult to form a coating layer of a desired thickness on a substrate. Unless the slurry (a) and the latex (b) are separately prepared and then mixed with each other, it is impossible to attain the viscosity and stability necessary as a coating dispersion, and achieve the coexistence of properties regarded as being incompatible in the obtained microporous structures.

In this invention, unlike the conventional method, a polyurethane type polymer is not dissolved in a good solvent capable of dissolving the said polymer nor is made into a slurry by the conjoint use of the said good solvent and a nonsolvent compatible with it, but a poor solvent having the above specified properties is used. Furthermore, in a mixture of the slurry (a) with the latex (b), water has reached at least saturation with respect to the poor solvent in the slurry (a).

Thus, by mixing the aqueous latex (b) with the slurry (a), the viscosity of a dispersion obtained by mixing becomes greater than that of the slurry (a) (viscosity increase effect). At the same time, there occur the increase in the proportion of insoluble particles in the slurry (a) and/or the increase of insoluble particles owing to the insoluble particles in the added latex (b) and/or the fluctuation of the diameter and size distribution of the insoluble particles (effect of increase in degree of slurry). By the term "degree of slurry" used here is meant the degree of increase of the insoluble particles and of the fluctuation in their diameter and size distribution. In addition to these effects, the formation and retaining of fine pores becomes easy as the solvent used for the slurry is a poor solvent for the polymer. Further, the polymer and water in the aqueous latex act synergistically on the coagulation of the polymer in the slurry and the formation and retaining of fine pores. In this case, the water in the aqueous latex acts for the coagulation of the polymer and the formation of fine pores, and the polymer in the latex acts strongly for the formation and retaining, especially the latter, of fine pores. It is conjectured that these factors serve for the formation of unique fine pores of microporous structures provided with the above-mentioned properties.

The polymer used for the formation of the polyurethane type polymer slurry is a known polyurethane type polymer obtained by the reaction of a diisocyanate compound, a long chain diol and an active hydrogen compound such as a lower molecular weight active hydrogen compound, which is made into a slurry in conjunction with a poor solvent for the polymer having a boiling point of not over 120° C. and a mutual solubility with water at 25° C. of not over 50% by weight. Such a polymer is produced either by a one shot method without the use of a solvent, a one shot method with the use of a solvent or a prepolymer method with the use of a solvent, but as the resulting polymer is used in the form of a slurry, the prepolymer method is preferable.

The examples of the said diisocyanate compound are 4,4'-diphenylmethane diisocyanate, 1,4 - xylylene diisocyanate and p-phenylene diisocyanate. Furthermore, 2,4-tolylene diisocyanate, 2,6-tolylene diisocyanate and 1,3-xylylene diisocyanate are also usable in conjunction with a long chain diol having a molecular weight as low as about 500 to 1,500.

As the long chain diol, we can cite poly-ε-caprolactone, diol polytetramethyleneether glycol, polybutylene adipate, polydiethylene adipate, polyethylenepropylene adipate and polyethylene adipate having a molecular weight of 500–4,000, for instance.

As the low molecular weight active hydrogen compound, usable are, for instance, ethylene glycol, propylene glycol, 1,4-butanediol, diethylene glycol, monoethanolamine and analogous compounds.

These starting materials should be such that they form a slurry when polymerised in a solvent mentioned below. Preferable examples are a combination of polyethylene adipate having a molecular weight of 1,600 to 2,000 with 4,4'-diphenylmethane diisocyanate and 1,4-butanediol, a combination of the said polyethylene adipate with 1,4-xylylene diisocyanate and 1,4-butanediol, and a combination of polyethylenepropylene adipate having a molecular weight of 1,300–2,000 with 4,4'-diphenylmethane diisocyanate and 1,4-butanediol.

The poor solvent can give a slurry when mixed with the said polymer in practical concentrations.

According to the method of this invention, a slurry is coagulated and shaped only by the evaporation of the solvent and drying. The use of a high boiling solvent is therefore not economical in its removal by evaporation, and is likely to cause agglomeration of the formed fine pores as a temperature at which the solvent is removed by evaporation comes close to the softening point of the polymer. Furthermore, if the boiling point of the solvent is much higher than 100° C. which is the boiling point of water, the evaporation of water in the aqueous latex incorporated in the slurry becomes rapid during the removal of the solvent by evaporation, with the result that the effect of porosity by water cannot be attained, and the agglomeration of fine pores tends to occur. It is necessary therefore that the boiling point of the solvent used in this invention should not exceed a point just a little higher than the boiling point of water, that is, about below 120° C. Furthermore, this invention necessitates the use of a poor solvent having a mutual solubility with water of not over about 50%, because the use of a solvent having a large mutual solubility with water is just the mere addition of water and a polymer, the effect of addition of an aqueous latex cannot be attained and it is difficult to make a porous structure.

As the poor solvent which satisfies these conditions, preferably used are methyl ethyl ketone, diethyl ketone, methylisobutyl ketone, methyl acetate, ethyl acetate, butyl acetate, 1,2-dichloroethane, and 1,1-dichloroethane either alone or in combination. It is possible to add less than 10% by weight, based on the said poor solvent, of benzene, toluene or hexane to increase the poor solvency of the system, and if desired, acetone, tetrahydrofuran or dioxane to elevate the water-containability of the slurry.

In the polyurethane type polymer slurry (a), a dissolved portion and an undissolved portion of the polymer are dispersed in the solvent. The resulting dispersion is such that the undissolved portion is not less than 20% of the polymer and, when the total polymer content is 20% more than 90% of dispersed particles of the undissolved portion have a diameter not more than 20 microns. (In an ordinary condition, almost all of the particles have a diameter not more than 10 microns.)

The above-mentioned aqueous latex which is other component for the coating dispersion in this invention is an aqueous dispersion containing a natural or synthetic polymer which when incorporated into the slurry (a), increases the degree of slurry and makes it possible to disperse a sufficient amount of water in the resulting dispersion, thus forming a coating dispersion having an increased viscosity and stability.

When the polymer in the aqueous latex is completely dissolved in a poor solvent, it is quite like merely adding water and the polymer individually, and there is no effect of increasing the degree of slurry and of increasing the viscosity. Water is not dispersed stably in the coating dispersion, and it is not possible to form a microporous structure having the above-mentioned properties from such dispersion. The polymer in the aqueous latex of this invention should be swellable by but not completely soluble in the poor solvent. As such aqueous latex, aqueous latices of polymers of acrylic ester, acrylic ester/vinyl acetate, acrylonitrile/butadiene, styrene/butadiene, vinyl acetate and vinyl chloride either alone or in combination. A preferable example of such aqueous latex is a combination of acrylonitrile butadiene latex with a vinyl chloride latex or an acrylic ester latex. To enhance the water-containability of the latex, not more than 20% by weight of a hygroscopic poor solvent can be added to the latex. As the hygroscopic solvent, there can be mentioned methyl alcohol, tertiary butyl alcohol, ethylene glycol monomethyl ether, propylene glycol monomethyl ether, etc.

The aqueous latex is ordinarily used in a concentration of 5–40%, preferably 10–25%. The amount of the aqueous latex to be added is 50–250% by weight, preferably 90–200% by weight, based on the polymer in the slurry. The solid quantity of the latex to be added (b) is ordinarily not more than 30% by weight of the polymer in the slurry (a) because too much of it will spoil the properties of the resulting structure.

It is necessary that in a coating dispersion obtained by mixing the polyurethane type polymer slurry (a) and the aqueous latex (a), water should reach at least saturation with respect to the poor solvent. If the saturation is not attained and water is added after the formation of the coating dispersion or moisture is absorbed after it has been coated onto a substrate, it becomes impossible to form a microporous structure provided with the above-mentioned properties.

The mixing of the slurry (a) with the aqueous latex (b) can be effected by (1) adding aqueous latex (a) batchwise to slurry (b), (2) adding slurry (a) batchwise to aqueous latex (b), or (3) mixing (a) slurry continuously with (b) aqueous latex. Generally, it is preferable that the mixing should be carried out by the above methods (1) and (3) because according to method (2), viscosity is abruptly raised at a time of adding the slurry (a) to make the operation difficult.

A known additive such as dyestuff, pigment, cross-linking agent stabiliser and filler may be added to the coating dispersion. Such additive may optionally be added to the slurry (a) or aqueous latex (b) beforehand.

The coating dispersion is usually used in a concentration of 5–25%, preferably 12–20%.

The process of preparing a microporous structure from the coating dispersion comprises a step of applying the said dispersion to a desired substrate, a step of selectively evaporating the poor solvent in the said dispersion at least to a gellation point of the said dispersion while preventing the evaporation of water, and a drying step of evaporating the remaining water and poor solvent, and if necessary, curing the dried coated substrate. Many kinds of woven or knitted fabrics, nonwoven fabrics, and similar materials can be used as substrates used in the step of applying the coating dispersion. If an appropriate supporter is used as a substrate and coated, and then the supporter is stripped off after drying, a filmy microporous structure useful as a surface of a synthetic leather can be obtained. As the supporter, plastic films, silicon paper, polished glass sheets or metal sheets, or metal foils can be used.

The application of the dispersion to the substrate can be effected by dipping, coating, casting, spraying or other suitable known means. In the selective evaporation step, the poor solvent in the said dispersion need be evaporated while preventing the evaporation of water. This is because when water is evaporated together with the evaporation of the poor solvent, the effect of porosity by the water is insufficient, and a microporous structure having a high vapour permeability cannot be obtained. To effect such selective evaporation of the poor solvent, a suitable method according to the boiling point of the poor solvent used should be adopted. For example, when a low boiling poor solvent is used, it is easy to evaporate it at low temperatures. In this case, the evaporation of the poor solvent can selectively be done even in an atmosphere having a low humidity. If a relatively high boiling poor solvent having a boiling point of not over 120° C. is evaporated at a high temperature, an atmosphere having a high humidity is necessary in order to evaporate the poor solvent selectively.

Specifically, the temperature in the selective evaporation step ought to be not over 80° C. and a temperature at least 20° C. lower than the boiling point of a poor solvent having a minimum boiling point in the polymer slurry (a). At a temperature above 80° C. which is too near the boiling point of water, it becomes difficult to prevent the evaporation of water, and it is impossible to evaporate the poor solvent selectively. At a temperature more than 20° C. lower than the boiling point of the poor solvent, the poor solvent is evaporated too rapidly, and so macropores visible to the naked eye are prone to appear in the coated layer, which are likely to present too bad an appearance to be of practical value.

The lower limit of the temperature is the freezing point of the solvent, but preferably 10° C. in view of the time needed for the evaporation procedure.

The humidity in the selective evaporation step should be not more than 90% RH. At a humidity above 90% RH, a great quantity of water adheres to the surface of the coating dispersion coated onto the substrate and impedes the evaporation of the poor solvent.

The time of the selective evaporation should be such that the said dispersion reaches at least a gellation point. The gellation point means a point where the polymer in the dispersion is coagulated as a result of the evaporation of almost all of the poor solvent from the applied coating dispersion. (In other words, this is a point where a film from the polymer in the coating dispersion coated onto a substrate of polyethylene terephthalate film is strippable from the substrate while its film shape is being retained.) It is necessary to effect the selective evaporation of the poor solvent for a time until a gellation point is attained, so that the remaining poor solvent may not involve the agglomeration of the microporous structure and be detrimental to the porous structure when heated at a high temperature in the subsequent drying step.

As mentioned before, the coating dispersion applied to the substrate may be exposed to an atmosphere having a high humidity in order to carry out the selective evaporation of a poor solvent while preventing the evaporation of water in the selective evaporation step. In this case, the selective evaporation step seems to resemble a moisture-absorbing step in a conventional semiwet method. In the selective evaporation step of this invention, however, the layer of a coating dispersion never absorbs moisture since water has reached at least saturation with respect to the poor solvent in this layer. If a coating dispersion in which water has not reached saturation is prepared and caused to absorb moisture after having been coated, it is impossible to obtain a microporous structure provided with the intended properties of this invention.

Accordingly, a moisture-absorbing phenomenon which is hard to control and bad in reproducibility is not utilised in this invention, and by the use of a coating dispersion in which water reaches at least saturation with respect to the poor solvent, the poor solvent is selectively evaporated under the condition such as to prevent the evaporation of the water. Thus, according to this invention, drying can be carried out in a very wide range of atmospheres and the quality of the obtained product can be easily controlled.

Another characteristic of this invention is a complete absence of a coagulation treatment with a nonsolvent.

When the selective evaporation of a poor solvent is completed the resulting structure is considerably coagulated, and is not collapsed even by a light touch of hand on its surface. If a supporter is used as the substrate, the resulting structure has a self-retentivity to a degree such that the coated film may be stripped off from the supporter. A small amount of the poor solvent remains in the obtained structure, but without carrying out a coagulation treatment with a nonsolvent, such structure is dried to remove the remaining poor solvent together with water, whereby the intended microporous structure can be obtained. It is usually sufficient that the drying is carried out at 50–120° C. for 5 to 10 minutes.

The reason why the present invention can do without a coagulation treatment with a nonsolvent is that the boiling point of the solvent used in this invention is relatively low, that the solubility of the polymer in the poor solvent is low, that the mutual solubility with water of the poor solvent is not so high, and that the aqueous latex brings about a favourable effect. Almost all of the solvent is evaporated in the steps of the selective evaporation and drying, and therefore the recovery of the solvent is easy and practised rapidly. Thus, it is very advantageous from the viewpoint of operation.

The dried structure can be directly used, but by curing, it becomes a microporous structure having more excellent properties. The curing, if desired, may be carried out after drying thereby to improve the quality of a final product, for instance, abrasion resistance, and ordinarily carried out at 100–160° C. for 3 to 20 minutes.

The so obtained structure possesses an innumerable number of fine open pores, an excellent vapour permeability, a high strength, flexibility and excellent feel. It is also excellent in water-proofness because the used polymer is water repellent.

The operational conditions to be observed after the application to the drying step are closely related to the characteristics of the dispersion. If, for instance, the procedure of this invention are followed by the use of a dispersion which does not satisfy the conditions of the present invention as mentioned above, a microporous structure such as that obtained in the present invention cannot be obtained, and sometimes it is all the more worse than the conventional product. Likewise, if the conventional procedures are followed but with the use of a dispersion which satisfies the conditions of the present invention, there can only be obtained worse results than in the conventional method.

Only by fulfilling the conditions for the coating dispersion and also those for the formation of the microporous structure, there can be obtained a microporous structure having a high velocity of vapour permeability and being not deteriorated in tear strength and appearance which are incompatible with this excellent vapour permeability. The reason for this is not entirely known, but is presumed to be as follows:

In a dispersion layer formed by a coating dispersion which has been obtained by mixing the slurry (a) and aqueous latex (b) and in which water reaches at least saturation with respect to the poor solvent in the mixture, the polymer is in the state of being easily coagulated into a porous form owing to the water dispersed there, and upon the selective evaporation of the poor solvent, is coagulated without forming a substantial film. At this time, the polymer which constitutes the aqueous latex (b) and has a swellability against the poor solvent prevents the polymer particles in a slurry (a) from agglomerating with each other, and acts so that it may lead to the formation of fine open pores owing to the difference in cohesive force between the polymers and retain them, or may help to form them. The so formed fine open pores are directly dried without a coagulating treatment with a nonsolvent, and are retained without almost being agglomerated by the residual solvent.

According to this invention, staple fibers may be added to a coating dispersion. If such coating dispersion is used, the feel and appearance vary according to the type, shape, amount, etc., of the added staple fibers. Thus, it is possible to obtain a microporous structure having more excellent vapour permeability and durability and also leather-like feel and appearance suited for the respective use.

According to the process of this invention, it is possible to produce a microporous structure rapidly and economically. As the obtained microporous structure has fine open pores, it has a beautiful appearance, excellent durability, high vapour permeability and also water repellency, and can be used in various forms. If, for instance, a microporous structure obtained by using a knitted or woven fabric, nonwoven fabric or a similar substance as a substrate can be used directly or after having been associated with other substrate. If desired, the so obtained structure is used as a substrate and associated with a filmy microporous structure as a surface which has been separately prepared. It is also possible to produce a filmy microporous structure in which a supporter is used as a substrate. Particularly, if a slurry containing staple fibers is coated onto a substrate, there can be obtined a microporous structure having a leather-like feel and appearance and an excellent vapour permeability and durability which is suited for a wide range of applications.

The microporous structure of this invention can be widely utilised as clothing, bags and shoe-uppers as a leather substitute. It is especially very useful as a leather substitute because it possesses excellent properties like those of a natural leather, excellent water repellency and a uniform quality.

To illustrate the process of this invention specifically, the working examples are given below. Unless otherwise specified, all parts are by weight.

EXAMPLE 1

A reaction vessel was charged with 325 parts of 4,4'-diphenylmethane diisocyanate maintained at 50° C. and 1,000 parts of polyethylene adipate (with a water content of 0.02%) with a molecular weight of 1710 maintained at 60° C. They were reacted under stirring for 60 minutes at 100° C. to give a prepolymer. A total amount of the resulting prepolymer was added to a mixture composed of 117 parts of tetramethylene glycol, 1,442 parts of methyl ethyl ketone (with a water content of 0.02%) and 1.0 part of triethylene diamine, and the resulting mixture was reacted for 90 minutes at 70° C. A prepolymer which is substantially hydroxy-terminated was obtained. A mixture composed of 965 parts of methyl ethyl ketone and 163 parts of 4,4'-diphenylmethane diisocyanate was added to the resulting prepolymer, and the resulting mixture was subjected to a chain-extension reaction for 4 hours at 70° C. A product containing a substantially linear polyester urethane was obtained. The viscosity of the product at the end of the reaction was about 40,000 cps. The product was diluted with methyl ethyl ketone to a solid content of 18%, and a whitely turbid slurry having a viscosity of 950 cps. at 30° C. was obtained.

One hundred (100) parts of this slurry was placed in a vessel, and while stirring by a homomixer, 25 parts of an equivalent mixture of a nitrile butadiene rubber latex (Croslene NS-16, product of Takeda Pharmaceutical Co., Japan) and a polyvinyl chloride latex (Geon 351, product of Japanese Geon Company, Japan) was added to thereby give a coating dispersion having a viscosity at 30° C. of 2,100 cps. The coating dispersion was applied to a glass sheet in a thickness in a wet condition of 0.5 mm., which was placed in a constant temperature-humidity device maintained at 30° C. and a relative humidity of 83%. The evaporation of methyl ethyl ketone was effected for 10 minutes in a very humid condition. At this time, the wet film containing the residual solvent can be easily stripped off from the glass sheet. The stripped film was dried for 5 miuntes at 110° C. A part of it was thereafter cured for 15 minutes at 120° C. The properties of the obtained microporous film are shown in Table 1.

For the sake of comparison, the results of the following five comparative examples are given in the same table.

Comparative Example 1

The same procedures an in Example 1 were repeated except that only water instead of the said two aqueous latices was added to the said methyl ethyl ketone slurry containing polyester urethane. The resulting coating dispersion was bad in stability, and it was clearly observed that it was separated into two layers 20 minutes after production. A film shaped from the coating dispersion immediately after production in the same manner as in Example 1 was bad in appearance and insufficient in the velocity of vapour permeability.

Comparative Example 2

The polyester urethane described in Example 1 was dissolved in dimethyl formamide to make a 25% solution. Twelve parts of a 50% dimethyl formamide aqueous solution was added to 100 parts of this solution to obtain a colloidal dispersion. This dispersion was coated onto a substrate in a thickness in a wet condition of 0.6 mm., and the moisture-absorption was carried out for 20 minutes at 30° C. and a relative humidity of 75%. It was then treated for 60 minutes with water at 25° C. and then for 15 minutes with water at 50° C. thereby to remove dimethyl formamide substantially. The subsequent drying for 12 minutes at 100° C. gave a porous film which was good in appearance, tensile strength, elongation at breakage, and tear strength, but was considerably inferior to the film of this invention is respect of the velocity of vapour permeability.

Comparative Example 3

A porous film was prepared according to the method described in Comparative Example 2 from a solution of 8 parts of the aqueous latex described in Example 1 in 100 parts of a dimethyl formamide solution of polyester urethane described in Comparative Example 2.

Comparative Example 4

The polyester urethane described in Example 1 was dissolved in tetrahydrofuran to make a 25% solution. Twenty-five grams of ammonium carbonate was added to 100 parts of this solution. This polymeric solution containing ammonium carbonate was poured onto a substrate in a thickness in a dry condition of 0.15 mm., which was treated for 80 minutes at 120° C. A porous film obtained by stripping off from the substrate contained pores visible to the naked eye, and was insufficient in tear strength, tensile strength and elongation at breakage.

Comparative Example 5

The polyester urethane described in Example 1 was dissolved in dimethyl formamide to make a 15% solution (A). Separately, a 10% dimethyl formamide solution (B) of polyvinyl chloride (Geon Resin 103EP–J, product of Japanese Geon Company, Japan) was prepared. Twenty parts of solution (B) was added to 100 parts of solution (A) to make a homogeneous solution, to which was added gradually 12 parts of a solution consisting of 50% of water and 50% of dimethyl formamide. Thus, a colloidal dispersion was obtained. This dispersion was coated onto a glass sheet in a thickness in a wet condition of 0.6 mm., which was immediately immersed in water at 20° C. without moisture-absorption unlike Comparative Example 2 or 3, and maintained for 8 hours. The obtained wet film was heated for 10 minutes at 100° C. and then 5 minutes at 150° C. The obtained porous film did not have visible pores on the surface, but had macropores inside. It was somewhat dissatisfactory in appearance, and was inferior to the porous film of this invention in respect of tear strength and velocity of vapour permeability.

TABLE 1

| Run No. | Velocity of vapour permeability [1] (kg./cm.²/hr.) | Appearance [2] | Tensile strength [3] (kg./mm.²) | Elongation at breakage [3] (percent) | Tear strength [4] (kg./mm.) | Apparent density [5] (g./cm.³) |
|---|---|---|---|---|---|---|
| Example 1 | 7.4 | 10 | 0.79 | 310 | 2.88 | 0.69 |
| Comparative Example 1 | 1.8 | 1 | 2.30 | 425 | 4.10 | 0.82 |
| Comparative Example 2 | 4.4 | 10 | 0.65 | 260 | 2.22 | 0.60 |
| Comparative Example 3 | 4.0 | 9 | 0.59 | 241 | 2.07 | 0.61 |
| Comparative Example 4 | 8.5 | 1 | 0.28 | 150 | 1.02 | 0.45 |
| Comparative Example 5 | 3.4 | 7 | 0.56 | 235 | 2.10 | 0.51 |

[1] Measured according to JIS K-6549.
[2] The appearance of the product of Comparative Example 4 which is good in vapour permeability, but low in strength and bad in appearance with coarse macropores on the surface was designated as 1, and the appearance of the product of Comparative Example 3 which is bad vapour permeability but relatively good in strength with a smooth and compact surface was designated as 10. The estimation was made by 20 observers in terms of 10 grades inclusive of 1 and 10. The best and worst grades were excluded with respect to each product, and an arithmetic mean was determined with regard to the remaining values. The fractions of 0.5 and over were counted as a whole number, and the rest was disregarded.
[3] Measured according to JIS K-6301.
[4] Measured according to JIS K-6732.
[5] The weight (g) of a film having an area of 10 x 10 cm.² was divided by the volume (cm.³) determined from the thickness obtained according to JIS B-7509.

It is understood from the results of Example 1 and Comparative Example 1 of Table 1 that even if the same coat-forming polymer and porous structure-forming means are used, unless the conditions for the formation of the coating dispersion are satisfied, it is impossible to attain the properties such as those of the product obtained according to the process of this invention. Also, as can be understood from the results of Comparative Examples 2–5, when the same film-forming polymer is used but a different solvent and a different porous structure-forming means are used, either the velocity of vapour permeability or tear strength or appearance is not satisfactory. In order for a product to be provided with excellent velocity of vapour permeability, appearance, strength, and apparent density, it should satisfy a vapour permeability velocity of above 6 mg./cm.²/hr. (0.32 mm. thick), an appearance of 9–10, a tensile strength of above 0.65 kg./mm.² (per 0.17 mm. of thickness), an elongation at breakage of above 300% (per 0.17 mm. of thickness), tear strength of above 2.2 kg./mm. and an apparent density of 0.6–0.8 g./cm.³. According to the present invention, a microporous structure provided with these physical properties can be produced with an easily operable means and with good reproducibility.

EXAMPLE 2

The same procedures as in Example 1 were repeated except that an acrylic ester copolymer (consisting of methyl methacrylate, ethyl acrylate and glycidyl methacrylate in a molar ratio of 35:60:5) was used as the polymer in the aqueous latex (b) to be added to the polymer slurry (a). There was obtained a microporous film having the following properties:

Apparent density—0.65 g./cm.³
Tensile strength—0.67 kg./mm.²
Elongation at breakage—305%
Tear strength—2.53 kg./mm.
Velocity of vapour permeability—7.0 mg./cm.²/hr.

EXAMPLE 3

To 100 parts of the slurry obtained in Example 1 was added under vigorous stirring, 25 parts of an aqueous latex prepared by mixing a nitrile butadiene rubber latex (Hycar 1571, product of Japanese Geon Company, Japan) and a polyvinylchloride latex (Geon 576, product of Japanese Geon Company, Japan) in equivalent amounts in terms of solid content, and diluting the mixture with water to a concentration of 20%. The resulting coating dispersion had a viscosity at 30° C. of 1,850 cps.

This coating dispersion was applied by dip-coating onto a polyester film in a thickness in a wet condition of 1.0 mm., which was placed in a constant temperature-humidity device maintained at 30° C. and a relative humidity of 80%. The evaporation of methyl ethyl ketone was effected for 15 minutes in a very humid condition, followed by drying for 20 minutes at 90° C. The resulting microporous film had the following properties:

Apparent density—0.69 g./cm.³
Tensile strength—0.72 kg./mm.²
Elongation at breakage—305%
Tear strength—2.76 kg./mm.
Velocity of vapour permeability—7.1 mg./cm.²/hr.

EXAMPLE 4

The same procedures as in Example 1 were repeated except that polytetramethyleneether glycol having a molecular weight of 2,000 was used instead of the polyethylene adipate and methyl acetate was used as the poor solvent instead of the methyl ethyl ketone. The resulting microporous film had the following properties:

Apparent density—0.62 g./cm.³
Tensile strength—0.69 kg./mm.²
Elongation at breakage—322%
Tear strength—2.28 kg./mm.
Velocity of vapour permeability—6.8 mg./cm.²/hr.

EXAMPLE 5

The coating dispersion obtained in Example 1 was applied to a polyester film in a thickness in a wet condition of 0.6 mm., and under various conditions, the selective evaporation of methyl ethyl ketone was effected, followed by drying for 10 minutes at 100° C. and curing for 5 minutes at 130° C. The conditions for the selective evaporation and the properties of the film are shown in Table 2 below.

TABLE 2

| Run No. | 1 | 2 | 3 | 4 |
|---|---|---|---|---|
| Conditions for selective evaporation: | | | | |
| Temperature (° C.) | 15 | 15 | 35 | 35 |
| Humidty (percent RH) | 30 | 70 | 30 | 70 |
| Time (minute) | 15 | 15 | 10 | 10 |
| Properties of the film: | | | | |
| Apparent density (g./cm.³) | 0.65 | 0.62 | 0.75 | 0.69 |
| Tensile strength (kg./mm.²) | 0.75 | 0.69 | 1.23 | 0.78 |
| Elongation at breakage (percent) | 310 | 301 | 410 | 312 |
| Tear strength (kg.³/mm.) | 2.72 | 2.54 | 3.21 | 2.89 |
| Velocity of vapour permeability (mg./cm.²/hr.) | 7.1 | 7.6 | 2.1 | 6.8 |
| Appearance | 10 | 10 | 5 | 10 |

As shown in this table, it is an indispensable condition in the selective evaporation of the poor solvent of this invention to effect the evaporation of the poor solvent while preventing the evaporation of water.

EXAMPLE 6

One hundred parts of diphenylmethane diisocyanate was disolved in 43 parts of methyl ethyl ketone, and the solution was maintained at 25° C. in a reaction vessel. A solution prepared by dissolving 340 parts of polyethylene adipate having a molecular weight of 1,705 in 146 parts of methyl ethyl ketone at 50° C. was added, and reaction was carried out for 3 hours at 70° C. under stirring. A homogeneous mixture composed of 26 parts of 1,4-butanediol, 0.9 part of triethylene diamine and 279 parts of methyl ethyl ketone was added to the said solution, and reaction was carried out for 45 minutes at 70° C. A hydroxyl-terminated intermediate polymer was obtained. Two hundred and eighty-four parts of methyl ethyl ketone and 20 parts of diphenylmethane diisocyanate were successively added to the intermediate polymer, and reaction was carried out for 3.5 hours at 70° C. to give a substantially linear polyester urethane. It become a slurry at 70° C. when its concentration reached 40%. It had a viscosity of 4,370 cps. at the end of the reaction.

One hundred parts of the slurry diluted to 15% with methyl ethyl ketone was mixed while stirring with 10 parts of a 75% ethyl-acetate solution of trifunctional isocyanate (Desmodur L–75, product of Farbenfabriken Bayer AG., Germany) diluted to a concentration of 15% with methyl ethyl ketone at 50° C. for 5 hours and left to stand for 20 hours at 20–30° C.

One hundred parts of the so obtained slurry was mixed with vigorous stirring with 25 parts of a mixture (concentration being 15%) of Croslene NS–16 and Geon 351 in equivalent amounts in terms of solid content. The viscosity of the coating dispersion was 1,550 cps. at 25° C.

The resulting coating dispersion was applied to a supporter comprising a polyester film in a thickness in a wet condition of 0.5 mm., which was placed for 12 minutes in a constant temperature-humidity device maintained at 20° C. and a relative humidity of 60%. It was then dried for 10 minutes at 100° C. The so obtained film was flexible and mircoporous, and had the following properties:

Apparent density—0.75 g./cm.$^3$
Tensile strength—1.10 kg./mm.$^2$
Elongation at breakage—362%
Tear strength—2.94 kg./mm.
Velocity of vapour permeability—7.2 mg./cm.$^2$/hr.

EXAMPLE 7

The same procedures as in Example 6 were repeated except that the temperature in the humidity device was adjusted to 30° C. and the drying was effected for 10 minutes at 80° C. The resulting microporus film had the following properties:

Apparent density—0.78 g./cm.$^3$
Tensile strength—1.26 kg./mm.$^2$
Elongation at breakage—387%
Tear strength—3.18 kg./mm.
Velocity of vapour permeability—6.9 mg./cm.$^2$/hr.

EXAMPLE 8

The same procedures as in Example 6 were repeated except that polyethylene propylene adipate having a molecular weight of 1,725 was used instead of the polyethylene adipate in Example 6 and TE 62 (a latex of an acrylic ester copolymer, product of Matsumoto Yushi Kabushiki Kaisha, Japan) was used instead of Geon 351. The resulting microporous film had the following properties:

Apparent density—0.75 g./cm.$^3$
Tensile strength—1.07 kg./mm.$^2$
Elongation at breakage—369%
Tear strength—2.43 kg./mm.
Velocity of vapour permeability—7.1 mg./cm.$^2$/hr.

EXAMPLE 9

One hundred parts of the slurry obtained in Example 6 diluted to 20% with the same amount of methyl ethyl ketone was reacted with 10 parts of Desmodur L–75, diluted to 20% by using methyl ethyl ketone, as a cross-linking agent for 5 hours at 50° C., and left to stand for 24 hours at room temperature (20–30° C.). The so obtained slurry had a viscosity at 25° C. of 880 cps. The concentration of 100 parts of the said slurry was adjusted to 15% by addition of 34 parts of methyl ethyl ketone while stirring by means of a homomixer. Twenty-five parts of a latex mixture composed of Croslene NS–16 and Geon 351 in a solid content ratio of 50:50 and having a concentration of 15% was gradually added while stirring, and the stirring was continued for additional 15 minutes after the end of the addition of the total amount to give a thoroughly mixed slurry for immersion. The said slurry had a viscosity at 25° C. of 1,300 cps. A woven fabric of polyester fiber was immersed in a bath containing the said slurry, and taken out after a sufficient penetration. It was squeezed by a mangle at intervals to attain the resin take-up of 40 g./m.$^2$. It was then placed in a device maintained at 28° C. and a relative humidity of 75%, and the evaporation of methyl ethyl ketone for 10 minutes, followed by drying for 10 minutes at 80° C. A sheet obtained by curing the impregnated sheet for 5 minutes at 120° C. had a velocity of vapour permeability of 7.8 mg./cm.$^2$/hr. and an apparent density of 0.571.

EXAMPLE 10

The same procedures as in Example 9 were repeated by the use of the slurry obtained in Example 6. A coating dispersion having a viscosity at 25° C. of 1,750 cps. was obtained. The said coating dispersion was applied to a supporter consisting of polyester film by knife-coating method in a thickness of about 2 mm. in a wet condition, which was immediately put together with a woven fabric of polyamide fiber. Through the voids of a mangle the said slurry was coated onto the said woven fabric. The coated fabric was put into a device maintained at 25° C. and a relative humidity of 80%, and the evaporation of methyl ethyl ketone was effected for 40 minutes. The supporter was removed by stripping off, followed by drying the remaining sheet for 10 minutes at 80° C. There was obtained a sheet material having an excellent vapour permeability and a smooth and glossy surface with good tactile properties and appearance. The said sheet, when cured for 10 minutes at 120° C., had a velocity of vapour permeability of 5.4 mg./cm.$^2$/hr. a solid take-up of 182 g./m.$^2$ and a total weight of 290 g./m.$^2$.

EXAMPLE 11

The same procedures as in Example 9 were repeated except that a nonwoven fabric of polyester staple fibers was used instead of the fabric of polyester used as a substrate in Example 9. A sheet material having excellent feel and vapour permeability was obtained. It had the following properties:

Apparent density—0.433 g./cm.$^3$
Tensile strength (longitude)—1.89 kg./mm.$^2$
Tensile strength (transverse)—1.60 kg./mm.$^2$
Elongation at breakage (longitude)—77%
Elongation at breakage (transverse)—95%
Velocity of vapour permeability—8.1 mg./cm.$^2$/hr.

EXAMPLE 12

The slurry obtained in Example 6 was diluted with methyl ethyl ketone to a concentration of 20%. The said slurry (90.9 parts) was reacted with 9.1 parts of Desmodur L–75, diluted to 20% with methyl ethyl ketone, as a cross-linking agent for 5 hours at 50° C., and was left to stand for 20 hours at 20–30° C. The obtained slurry was stirred by a homomixer, and 34 parts of methyl ethyl ketone was added, followed by thorough mixing. Twenty-five parts of a latex mixture having a solid content of 1.5% and composed of Croslene NS–16 and Geon 351 in a solid content ratio of 80:20 was gradually added to the resulting mixture. After the addition of a total amount of the latex mixture the stirring was continued for further 10–15 minutes. If necessary, the reaction system was cooled so that the temperature of the system might not exceed 30° C. The obtained dispersion was once filtered, and 15 parts of polyester staple fibers (having a length of 2–10 mm. and a thickness of 1.5 denier) was added under stirring, and thoroughly dispersed. The so obtained dispersion was left to stand overnight or longer, and deprived spontaneously of foams. The so treated dispersion was coated onto a woven fabric of polyamide fibers, which was placed in a moisture-absorbing device maintained at 30° C. and at a relative humidity of 80%. The evaporation of methyl ethyl ketone was effected for 30 minutes, followed by drying for 15 minutes at 80° C. There was obtained a sheet material having a leather-like feel and appearance, which had a velocity of vapour permeability of 5.4 mg./cm.$^2$/hr., a resin take-up of 200 g./m.$^2$, and an apparent density of 0.664 g./cm.$^3$.

EXAMPLE 13

A coating dispersion was prepared in quite the same manner as in Example 12. After defoaming, the dispersion was coated onto a film of polyester. The coated film was superposed on a sheet material made of polyurethane filaments and polyester filaments obtained by dry-spinning. The superposed product was put into an atmosphere having a temperature of 25° C. and a relative humidity of 80%. The evaporation of methyl ethyl ketone was effected for 40 minutes, and the polyester film as a supporter was then stripped off, followed by drying for 15 minutes at 100° C. To enhance the durability of a final product, curing was effected for 15 minutes at 120° C. There was obtained a sheet having a natural leather-like feel and appearance and excellent vapour permeability and durability. The sheet had the following properties:

Apparent density—0.672 g./cm.$^3$
Velocity of vapour permeability—5.3 mg./cm.$^2$/hr.
Tensile strength (longitude)—105 kg./mm.$^2$
Tensile strength (transverse)—74 kg./mm.$^2$
Elongation at breakage (longitude)—218%
Elongation at breakage (transverse)—169%

EXAMPLE 14

The same procedures as in Example 12 were repeated except that acrylonitrile staple fibers having a length of 4–12 mm. and a thickness of 3 deniers were used in the step of forming a coating dispersion. There was obtained a sheet excellent in feel, appearance, vapour permeability and durability. The feel of the said sheet was somewhat superior to that in Example 12, and the sheet had a velocity of vapour permeability of 5.2 mg./cm.$^2$/hr. an apparent density of 0.698 g./cm.$^3$, and a resin take-up of 213 g./m.$^2$. The resulting sheet can be used as a leather substitute directly or after put together with a flexible substrate as a lower layer or with a microporous film as an upper layer.

EXAMPLE 15

A coating dispersion was prepared in the same manner as in Example 12 except that 10 parts of polyamide staple fibers having a length of 5–12 mm. and a thickness of 2 denier were added. The resulting coating dispersion was applied to a supporter consisting of a polyester film in a thickness in a wet condition of 0.8 mm., which was put into an atmosphere at 25° C. and a relative humidity of 80%, followed by the evaporation of methyl ethyl ketone for 30 minutes. The product was then left to stand in a room having a temperature of 24° C. and a relative humidity of 55%, and then dried for 10 minutes at 100° C. The obtained sheet was superposed on a substrate consisting predominantly of a nonwoven fabric. The resulting product can be used as a leather substitute having the following properties:

Apparent density—0.746 g./cm.$^3$
Tensile strength—1.85 kg./mm.$^2$
Elongation at breakage—349%
Velocity of vapour permeability—5.1 mg./cm.$^2$/hr.

We claim:
1. A process for the production of a microporous structure which comprises:
   (A) coating onto a surface of a substrate a polymer dispersion prepared by:
      (1) dispersing a polyurethane obtained by the reaction of a long chain diol, selected from the group consisting of poly-ε-caprolactone, diol polytetramethylene ether glycol, polybutylene adipate, polyethylenepropylene adipate and polyethylene adipate having a molecular weight of 500–4,000, a diisocyanate selected from 4,4'-diphenylmethane diisocyanate, 1,4 - xylyldiisocyanate, and p-phenylene diisocyanate, and a lower molecular weight active hydrogen compound selected from the group consisting of ethylene glycol, propylene glycol, 1,4 - butanediol and diethylene glycol, in a poor solvent for said polyurethane which has a boiling point not over 120° C. and a mutual solubility with water at 25° C. of not over 50% by weight, said poor solvent being selected from the group consisting of methyl ethyl ketone, diethyl ketone, methylisobutyl ketone, methyl acetate, ethyl acetate, butyl acetate, 1,1 - dichloroethane and 1,2 - dichloroethane to form a polyurethane slurry (a); and
      (2) mixing said slurry (a) with an aqueous latex (b) of a polymer swellable by, but not completely soluble in, said poor solvent, said latex comprising an aqueous emulsion containing at least one polymer selected from the group consisting of poly(acrylic ester), a copolymer of acrylic ester and vinyl acetate, an acrylonitrile-butadiene copolymer, a styrene-butadiene copolymer, poly(vinyl acetate) and poly(vinyl chloride) which latex has a polymer concentration of 5–40% by weight, thereby to form a polymer dispersion consisting essentially of said components (a) and (b) in which the water content has reached at least saturation with respect to the poor solvent in said dispersion, the amount of the aqueous latex (b) being 50–250% by weight based on the weight of the polyurethane in the slurry (a), the total amount of the polymer in the dispersion being 5–25% by weight, the amount of said polymer in the aqueous latex (b) being not more than 30% by weight based on the weight of the polyurethane in said slurry (a);
   (B) selectively evaporating said poor solvent while preventing the evaporation of water from the formed dispersion layer in an atmosphere of relative humidity not more than 90% and at a temperature not over 80° C. and at least 20° C. lower than the boiling point of a poor solvent having the lower boiling point but at a temperature not lower than the freezing point of said solvent, at least to the gellation point of said dispersion so as to solidify said dispersion in a porous state; and
   (C) thereafter drying the product.
2. The process of claim 1 wherein curing is carried out at a temperature of 100 to 160° C. for about 20 to 3 minutes after drying.
3. The process of claim 1 wherein staple fibers are incorporated into the said coating dispersion.
4. A microporous structure having a porous coating having a velocity of vapour permeability of above 6 mg./cm.$^2$/hr. (thickness of 0.32 mm.), tensile strength of about 0.65 kg./mm.$^2$ (thickness of 0.17 mm.), an elongation at breakage of above 300% (thickness of 0.17 mm.), a tear strength of above 2.2 kg./mm., and an apparent density of 0.6–0.8 g./cm.$^3$, said microporous structure comprising a substrate having thereon a porous coating comprising a dried and cured residue of a dis- persion consisting essentially of (a) a slurry of a polyurethane obtained by the reaction of a long chain diol selected from the group consisting of poly-ε-caprolactone diol, polytetramethylene ether glycol, polybutylene adipate, polyethylene-propylene adipate and polyethylene adipate having a molecular weight of 500–4,000, a diisocyanate selected from 4,4'-diphenylmethane diisocyanate, 1,4-xylylenediisocyanate, and p-phenylene diisocyanate, an an active hydrogen compound selected from the group consisting of ethylene glycol, propylene glycol, 1,4-butanediol and diethylene glycol, in a poor solvent, said poor solvent being selected from the group consisting of methyl ethyl ketone, diethyl ketone, methylisobutyl ketone, methyl acetate, ethyl acetate, butyl acetate, 1,1-dichloroehane and 1,2-dichloroethane, and (b) an aqueous latex of a polymer comprising an aqueous emulsion containing at least one polymer selected from the group consisting of poly(acrylic ester), a copolymer of acrylic ester and vinyl acetate, an acrylonitrile-butadiene copolymer, a styrene-butadiene copolymer, poly(vinyl acetate) and poly(vinyl chloride), said latex having a polymer concentration of 5–40% by weight, said aqueous latex (b) comprising 50–250% by weight based on the weight of said polyurethane in slurry (a), the total amount of polymer in the dispersion being 5–25% by weight, and the polymer in said aqueous latex being not more than 30% by weight based on the weight of the polyurethane in slurry (a).

References Cited

UNITED STATES PATENTS

| | | | |
|---|---|---|---|
| 2,901,467 | 8/1959 | Croco | 117—161X |
| 3,000,757 | 9/1961 | Johnston et al. | 117—63 |
| 3,100,721 | 8/1963 | Holden | 117—135.5 |
| 3,169,885 | 2/1965 | Golodner et al. | 117—135.5 |
| 3,322,568 | 5/1967 | Golodner | 117—135.5 |

WILLIAM D. MARTIN, Primary Examiner

T. G. DAVIS, Assistant Examiner

U.S. Cl. X.R.

117—135.5, 138.8, 140; 264—49

UNITED STATES PATENT OFFICE
CERTIFICATE OF CORRECTION

Patent No. 3,554,789        Dated January 12, 1971

Inventor(s)  Koji Kigane et al.

It is certified that error appears in the above-identified patent and that said Letters Patent are hereby corrected as shown below:

Claim 1, line 12, "xylyldiiso-" should read -- xylenediiso- --.

Signed and sealed this 23rd day of March 1971.

(SEAL)
Attest:

EDWARD M. FLETCHER, JR.
Attesting Officer

WILLIAM E. SCHUYLER,
Commissioner of Paten